United States Patent [19]
Wingfield et al.

[11] Patent Number: 5,333,724
[45] Date of Patent: Aug. 2, 1994

[54] OVEN-CONVEYOR CLEANING APPARATUS AND METHOD

[76] Inventors: William R. Wingfield, 11032 Thorncroft; Dr., Glen Allen, Va. 23060; Leslie A. Childs, 8602 Queensmere Pl., Richmond, Va. 23294; Clarence L. Pilaczynski, 800 Boulder Springs Dr., Richmond, Va. 23225

[21] Appl. No.: 46,288
[22] Filed: Apr. 14, 1993
[51] Int. Cl.$^5$ .............................................. B65G 45/00
[52] U.S. Cl. ..................................... 198/495; 198/496; 15/302
[58] Field of Search ........................ 198/494, 495, 496; 15/302

[56] References Cited

U.S. PATENT DOCUMENTS

| | | | |
|---|---|---|---|
| 1,543,411 | 6/1925 | Wittig | 198/495 |
| 2,266,309 | 12/1941 | Cohen | 198/495 |
| 2,881,463 | 4/1959 | Vogel | 15/302 |
| 3,464,081 | 9/1969 | Wisner . | |
| 3,859,163 | 1/1975 | Haythornthwaite | 15/302 X |
| 4,042,993 | 8/1977 | Cervin | 198/496 X |
| 4,897,202 | 1/1990 | King | 198/495 X |
| 4,897,203 | 1/1990 | King | 198/495 X |
| 4,960,200 | 10/1990 | Pierce | 198/495 |
| 5,117,967 | 6/1992 | Morrow et al. | 198/495 |

FOREIGN PATENT DOCUMENTS

| | | | |
|---|---|---|---|
| 0448080 | 9/1991 | European Pat. Off. | 198/495 |
| 2245538 | 4/1974 | Fed. Rep. of Germany | 198/494 |
| 0973448 | 11/1992 | U.S.S.R. | 198/494 |

*Primary Examiner*—Cheryl L. Gastineau
*Attorney, Agent, or Firm*—Millen, White, Zelano, & Branigan

[57] ABSTRACT

A cleaning apparatus for cleaning of food-processing conveyor belts, particularly of metal conveyor belts used to convey bakery goods through baking ovens, includes an equipment carrier including pumping and vacuum equipment; mounts for mounting frame members carrying cleaning heads including cleaning and rinsing solution applicators, a brush, a splash shield, and vacuum heads; and, interconnections for connecting carrier-supported equipment to cleaning heads. In operation, cleaning heads are mounted to the mounts and are connected to the carrier-supported equipment; and, the conveyor belt is sprayed and soaked with a cleaning solution and left for a time before having the solution together with debris and residual and carbonized matter rinsed off and vacuumed up. Brushes brush the conveyor during cleaning and rinsing.

23 Claims, 2 Drawing Sheets

5,333,724

OVEN-CONVEYOR CLEANING APPARATUS AND METHOD

This invention relates to apparatus and a method for cleaning conveyor belts and, more particularly, for cleaning metal food-processing conveyor belts for conveying bakery goods through baking ovens.

Various devices are known for cleaning conveyor belts used in food processing. For instance, Vogel (U.S. Pat. No. 2,881,463) discloses a conveyor-washing apparatus that straddles upper and lower faces of a moving conveyor belt (68) from one side with revolving brushes (64,65). Water is sprayed from a bar (70) to a zone proximate to the brushes. Water is collected in a liquid collector member of housing (65) for removal through drain (69), and that provides for removal of free moisture by air directed from air lines (76) against the upper surface of the conveyor belt.

Cohen (U.S. Pat. No. 2,266,309) discloses a belt washer employing high-pressure heated water that is forced out of rows of nozzles onto both faces of the belt.

Wittig (U.S. Pat. No. 1,543,411) describes cleaning apparatus of a conveyor-belt surface in a picking table for pea viners and cleaners. The apparatus includes means for spraying liquid onto the belt and moistening adhering dirt or trash and a rotary brush to brush off loose dirt portions, as well as a knife to scrape off material adhering to the belt.

A conveyor belt cleaning apparatus having a tank for holding cleaning fluid and nozzles for applying fluid to a removable pad for cleaning and sanitizing of the belt is described in Morrow et al. (U.S. Pat. No. 5,117,967).

Another example of a conveyor-belt cleaning device is, for instance, disclosed in U.S. Pat. No. 4,960,200 (Pierce).

Many conventional devices for cleaning food-processing conveyors are known to be significantly lacking in adequacy of removal of baked-on dirt and carbonized matter from conveyor belts. Removal of baked-on matter has hitherto posed practical problems, as for instance resulting from long down-times of conveyor systems (for cleaning purposes), needs for labor-intensive and thusly relatively expensive washing procedures; and, generally needs for costly, complex equipment and lengthy cleaning times.

Accordingly, it is an object of the present invention to provide an improved oven-conveyor cleaning apparatus and method for washing, rinsing, and removal of baking residue and carbonized matter from conveyor belts.

SUMMARY

In accordance with principles of the present invention, there is provided a cleaning apparatus for cleaning food-processing conveyor belts, particularly of metal conveyor belts used to convey bakery goods through baking ovens. The apparatus comprises: a mobile equipment carrier including thereon supported powered pumping and vacuum equipment and associated controls; mounting means attached to oven structures (upstream from the oven inlet and downstream from the oven delivery end) for mounting frame members for carrying cleaning-head means including cleaning and rinsing solution applicators, a brush, a splash shield, and vacuum heads; and, interconnections for connecting carrier-supported equipment to the cleaning head means.

In operation, cleaning head means (excluding vaccum heads) are mounted to the mounting means upstream of the oven intake and are connected to the carrier-supported equipment; power, water, and drain connections to respective building service facilities are made; and, the moving conveyor is sprayed with a cleaning solution and allowed to soak for a time. Thereafter, cleaning-head means are dismounted and are remounted together with vacuum heads in a location downstream of the delivery end of the oven. Cleaning head means are then fed with rinsing liquid to rinse off the cleaning solution together with debris, carbonized and other residual matter, much of which is subsequently vacu-' umed up via the vacuum heads. Brushes brush the moving conveyor during cleaning and rinsing.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference numerals refer to like parts throughout different views. The drawings are schematic and not necessarily to scale, emphasis instead being placed upon illustrating principles of the invention.

DESCRIPTION OF THE PREFERRED EMBODIMENTS

Figure 1:
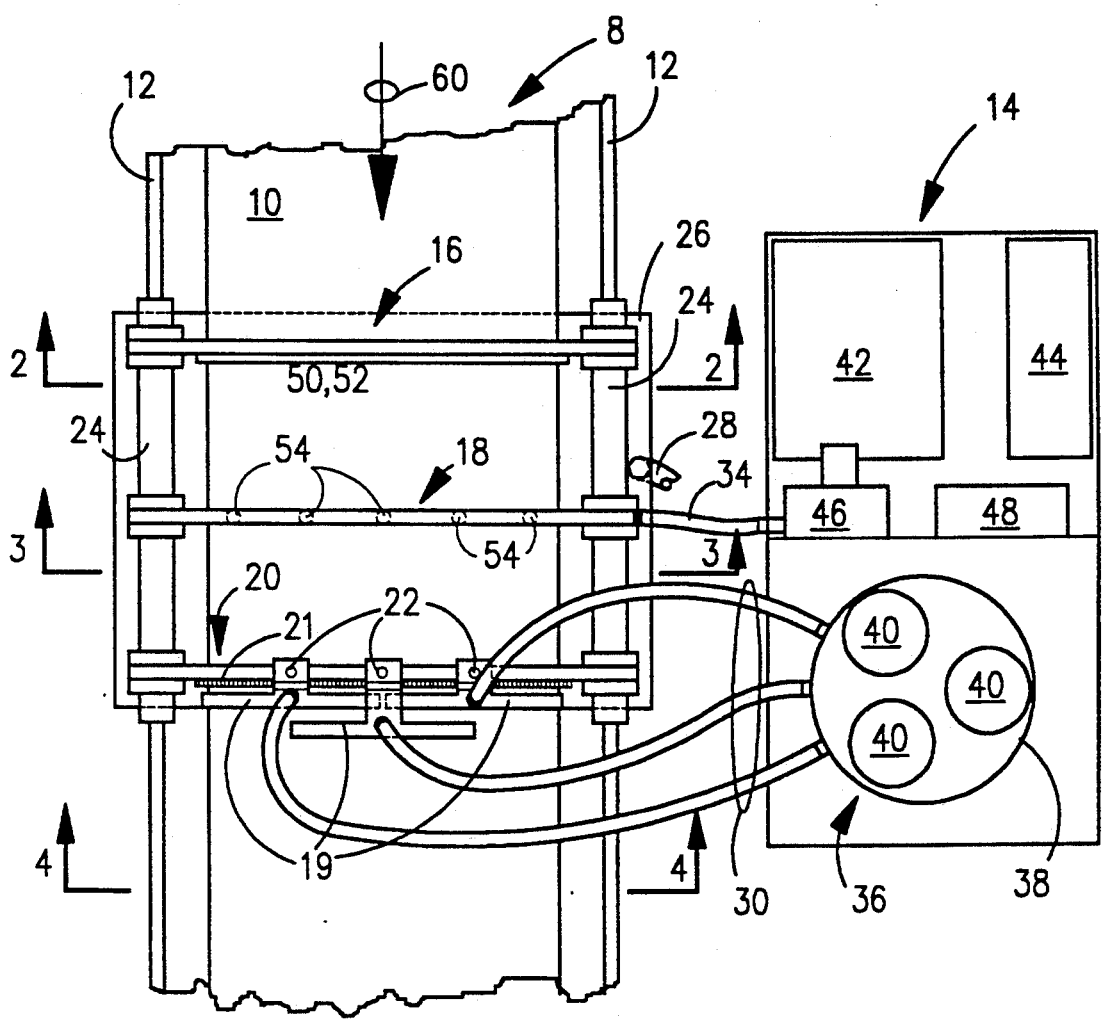
FIG. 1 is a schematic top view of an embodiment of the apparatus according to principles of this invention.
Figure 2:
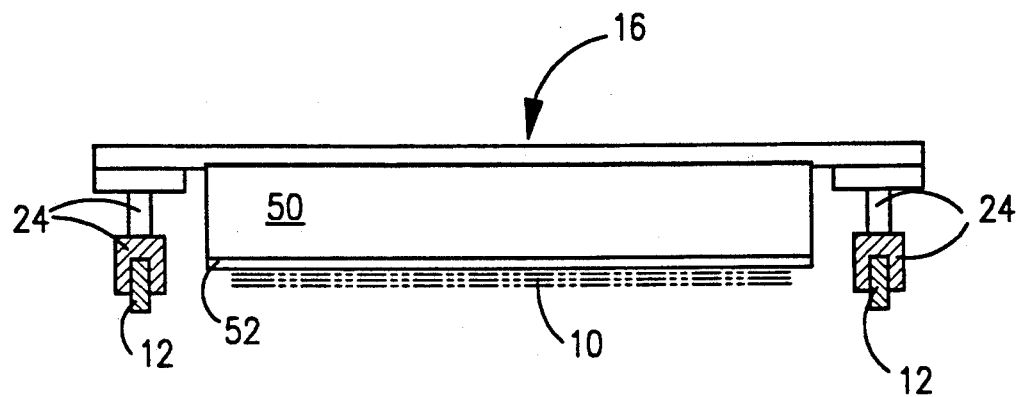
FIG. 2 is a schematic partial side elevational view and section, along section lines 2—2, of a portion of the apparatus shown in FIG. 1.
Figure 3:
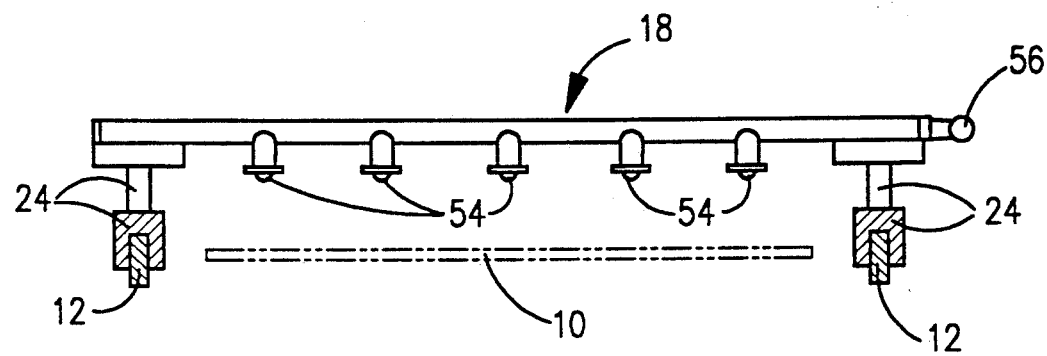
FIG. 3 is a schematic partial side elevational view and section, along section line 3—3, of another portion of the apparatus shown in FIG. 1; and, FIG. 4 is a schematic partial side elevational view and section, along section line 4—4, of yet another portion of the apparatus shown in FIG. 1.
Figure 4:
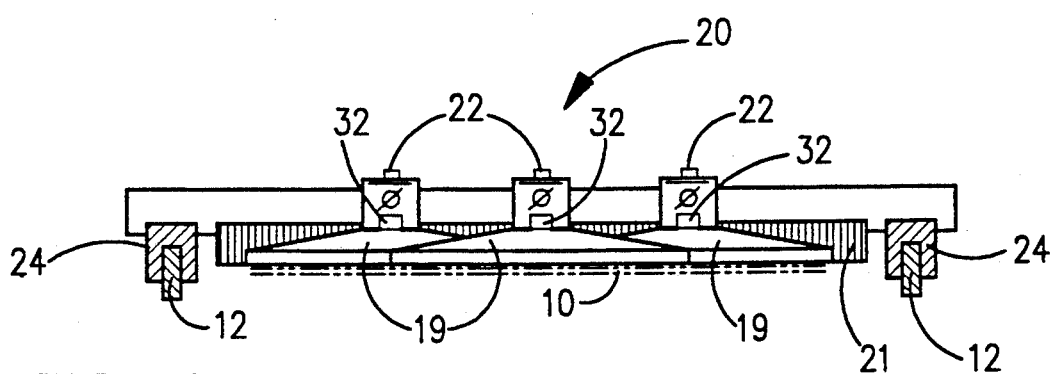

Referring now to FIGS. 1–4 of the drawings, there is depicted a fragmental portion of a food-processing baking-oven conveying system, specifically a portion of an oven-conveyor 8 having a conveyor belt 10 employed to convey bakery goods through a baking oven and having rails 12 disposed along and on the sides of belt 10.

Added to belt 10 and rails 12 in FIGS. 1–4 is an embodiment of the oven-conveyor cleaning apparatus according to the invention comprising a mobile equipment carrier 14, a splash shield assembly 16, a sprayer assembly 18, vacuum heads 19, a brush assembly 20 including a brush 21 and attachment means 22 for vacuum heads 19, collector pan 26 including drain 28, and vacuum hoses 30 connected to vacuum heads 19 at connectors 32. The apparatus further comprises a liquid hose 34 for feeding pressurized cleaning and rinsing liquids to the sprayer assembly 18, and mounting means 24 for mounting shield assembly 16, sprayer assembly 18, and brush assembly 20 upon rails 12.

Equipment carrier 14 comprises a vacuum collector 36 including a vacuum tank 38 and at least one motor 40 to generate vacuum in the tank. Tank 38 is connected to vacuum heads 19 by vacuum hoses 30 which are preferably provided with quick-release-type connectors. Carrier 14 further comprises various tanks for holding cleaning and rinsing liquids, as for instance the indicated tanks 42 and 44, and various pumps (46, 48) for liquid pressurization, exhaust, and the like. Sprayer assembly 18 is connected to pump 46 by liquid hose 34 which is preferably provided with a quick-release-type connector.

The equipment carrier 14 is mobile (for instance provided with wheels) and repositionable to different locations along the conveyor belt 10. In particular, carrier 14 is positioned upstream from the intake of the baking oven for applying cleaning liquid to belt 10 and downstream from the delivery end of the baking oven for applying rinsing liquid to and for vacuuming of belt 10. FIG. 1 is representative of either of these two positions.

Splash shield assembly 16 (FIG. 2) includes a relatively-rigid shield 50 and an edge blade 52 of elastomeric material (such as rubber) to provide wiping contact with belt 10. Splash shield assembly 16, sprayer assembly 18, and brush assembly 20 are mounted upon mounting means 24. The latter includes two mounting adaptors (one on each side of belt 10 on respective rail 12) which can be identical and which attach permanently to appropriate positions of the oven conveyor rails 12 for adaption of the rails to mount shield assembly 16, sprayer assembly 18, and brush assembly 20. Mounting means 24 are preferably provided in two appropriate locations; specifically upstream from the intake of the baking oven and downstream from the delivery end of the baking oven.

Sprayer assembly 18 (FIG. 3) includes spray nozzles 54 and a quick-release coupler 56 (for connecting to hose 34). When supplied with pressurized liquid via hose 34 (from carrier 14), nozzles 54 spray liquid onto belt 10.

Brush assembly 20 (FIG. 4) includes brush 21 mounted such as to brush the surface of the moving conveyor 10. Assembly 20 further includes attachment means 22 for vacuum heads 19. Vacuum heads 19 are shown (in FIG. 1) attached to brush assembly 20, but they can be removed.

Collector pan 26, having drain 28 attached thereto, is disposed beneath the conveyor belt 10 broadly in the region of the downwardly directed nozzles 54 to capture and drain off cleaning and rinsing liquids that are sprayed by the nozzles and that drain through the belt 10.

In a preferred method of operation of the oven-conveyor cleaning apparatus of the invention, shield assembly 16, sprayer assembly 18, and brush assembly 20 are mounted onto the mounting means 24 that is mounted on rails 12 in an upstream location in respect to the conveyor intake to the baking oven. The conveyor belt 10 (of oven-conveyor 8) is appropriately driven to move in the normal forward direction indicated by arrow 60 in FIG. 1.

Equipment carrier 14 is positioned adjacent to the location of mounting means 24 with the thereupon mounted assemblies 16, 18, and 20. Sprayer assembly 18 is connected by hose 34 to pump 46 to receive pressurized cleaning liquid. Alternately, hose 34 can be connected directly to a pressurized cleaning liquid tank, such as, for instance, tank 42. Pumping equipment on carrier 14 is powered up and cleaning liquid is sprayed onto conveyor belt 10 by nozzles 54. The liquid covers and soaks into and through belt 10 and serves also to soak and clean the rollers upon which belt 10 runs. Cleaning liquid draining from the belt and rollers is collected by collector pan 26 and drained therefrom via drain 28.

Shield assembly 16 shields upstream belt portions from receiving undesirable spray. Brush 21 serves to assist cleaning and washing of belt 10 and it serves to brush cleaning liquid into pores of the belt. It should be understood that belt 10 is customarily made from steel (usually stainless) in the form of wire mesh, perforated steel bands, tight-weave web, or the like. Brush 21 is also operative in releasing baked-on debris and carbonized matter from belt 10.

Spraying of moving conveyor belt 10 with cleaning liquid is performed for a time of at least about one half hour or for the duration of at least one to two revolution cycles of the moving conveyor belt. More preferably, the cleaning-liquid spraying time should be about 40 minutes or it should be the time required for about 3-4 revolution cycles of the conveyor belt. During this time, brushing of belt 10 with brush 21 is also performed.

After the spraying operation, belt 10 is allowed to soak (with the cleaning liquid sprayed on) for at least one half hour, but more preferably for about one hour or the time it takes for about 3-4 revolution cycles of the moving belt 10.

Subsequent to the spraying and brushing operation, shield assembly 16, sprayer assembly 18, and brush assembly 20 are dismounted and mounted onto the mounting means 24 that is mounted on rails 12 in a downstream location in respect to the conveyor delivery end of the baking oven. The conveyor belt 10 (of oven-conveyor 8) continues to be appropriately driven to move in the normal forward direction indicated by arrow 60 in FIG. 1.

Equipment carrier 14 is then repositioned adjacent to the location of mounting means 24 with the thereupon mounted assemblies 16, 18, and 20; i.e. now in a location downstream from the delivery end of the oven. Vacuum heads 19 are then attached via attachment means 22 to brush assembly 20; and, connectors 32 of vacuum heads 19 are connected by vacuum hoses 30 to the vacuum tank 38 of the carrier 14.

Sprayer assembly 18 is connected by hose 34 to pump 46 to receive pressurized rinsing liquid. Alternately, hose 34 can be connected directly to a pressurized rinsing liquid tank, such as for instance tank 42. Pumping equipment on carrier 14 is then powered up and rinsing liquid is sprayed onto conveyor belt 10 by nozzles 54. The liquid rinses belt 10 and serves also to rinse the rollers upon which belt 10 runs. Rinsing liquid draining from belt and rollers is collected by collector pan 26 and drained therefrom via drain 28. Shield assembly 16 shields upstream regions from being splashed, and its edge blade 52 also serves to detach soaked debris from the belt. Brush 21 serves to assist rinsing belt 10 and it facilitates penetration of rinsing liquid into pores of the belt, as well as detachment of adhering debris.

Spraying of moving conveyor belt 10 with rinsing liquid is performed for a time of at least about one hour or for the duration of at least two to four revolution cycles of the moving conveyor belt. Preferably, the rinsing liquid spraying time should be about 2-2.5 hours or for about 6-8 revolution cycles of the conveyor belt. During this time, brushing of belt 10 with brush 21 is also performed.

Moreover, during the entire rinsing-liquid spraying time, vacuuming of the belt is performed by heads 19 in order to remove dirt, debris, carbonized matter, and rinsing liquid and the like. Vacuumed-up materials are collected in vacuum collector 36 for eventual appropriate disposal.

While the invention has been particularly shown and described with reference to preferred embodiments thereof, it will be understood by those skilled in the art that various changes and modifications in form and details may be made therein without departing from the spirit and scope of the invention.

The embodiments of the invention in which an exclusive property or privilege is claimed are defined as follows:

1. A cleaning apparatus for a conveyor belt that is employed to convey foods through an oven for baking of said foods, there being defined an upstream location in respect to the conveyor intake to the oven and a downstream location in respect to the delivery end of the oven, the cleaning apparatus comprising:
   carrier-supported equipment;
   a carrier to carry said carrier-supported equipment;
   a pair of rails being attached to the structure of said oven in said upstream location and in said downstream location;
   a cleaning head assembly including means for mounting thereof selectively in said upstream location and in said downstream location on said pair of rails, said cleaning head assembly including means for spraying liquid onto said conveyor belt and means for vacuuming the moving conveyor belt, said means for vacuuming including at least one vacuum head for applying vacuum over a region that extends substantially across the surface width of the belt in the proximity of said downstream location, said mean for vacuuming being mounted on said means for mounting when said mounting means is mounted on said pair of rails in said downstream location, said means for vacuuming being disposed downstream in respect to said means for spraying liquid in relation to the direction of motion of said belt; and,
   means for connecting said carrier-supported equipment with said cleaning head assembly, said carrier being selectively movable at least between locations in the vicinity of said upstream and said downstream locations, respectively, said means for connecting being quick-disconnectable;
   wherein said means for spraying liquid is fed cleaning solution while said cleaning head assembly is mounted on said pair of rails in said upstream location and whereby said means for spraying liquid is fed rinsing solution while said cleaning head assembly is mounted on said pair of rails in said downstream location.

2. The cleaning apparatus according to claim 1, wherein said cleaning head assembly further comprises means for brushing the surface of the moving conveyor belt, said means for brushing being disposed, in respect to the direction of motion of the belt, downstream relative to the location of said means for spraying liquid.

3. The cleaning apparatus according to claim 1, wherein said means for spraying liquid includes at least one spray nozzle.

4. The cleaning apparatus of claim 1, further including means for collecting cleaning and rinsing liquids draining from the conveyor belt in a draining region therebeneath, said means for collecting including a collecting pan and a drain connected thereto, said collecting pan being disposed beneath the belt.

5. The cleaning apparatus according to claim 1, wherein said carrier-supported equipment includes a vacuum collector including a vacuum tank, a motor to generate vacuum, and a vacuum hose for connecting said vacuum tank to said at least one vacuum head.

6. The cleaning apparatus of claim 5, wherein said carrier-supported equipment further comprises means for carrying said vacuum collector, said means for carrying being movable to different locations relative to the means for holding liquid solutions and means for pumping of solutions from said means for holding.

7. The cleaning apparatus according to claim 1, wherein said cleaning head assembly further comprises a splash shield assembly including a shield and a blade, said splash shield assembly being disposed, in respect to the direction of motion of the belt, in an upstream location relative to the location of said means for spraying.

8. A method of cleaning a conveyor belt that is employed to convey foods through an oven for baking of the foods, the method comprising the steps of:
   moving the conveyor belt;
   applying vacuum to the moving conveyor belt over a region that extends substantially across the surface width of the belt in a location downstream from said oven;
   applying cleaning liquid to the moving conveyor belt in a location upstream from said oven;
   applying rinsing liquid to the moving conveyor belt in a location downstream from said oven and upstream of said region over which the step of applying vacuum is effected;
   soaking the conveyor belt with cleaning liquid as a consequence of the step of applying cleaning liquid, the step of soaking including delaying by a soaking time the steps of applying rinsing liquid and applying vacuum subsequently to the step of applying cleaning liquid;
   wherein the step of applying vacuum is effected subsequently to the initiation of the step of applying rinsing liquid.

9. The method of claim 8, wherein said soaking time is at least one half hour.

10. The method of claim 8, wherein said soaking time is a time during which the moving conveyor belt moves through three to four revolution cycles.

11. A method of cleaning a conveyor belt that is employed to convey foods through an oven for baking of the foods, the method comprising the steps of:
    moving the conveyor belt;
    applying vacuum to the moving conveyor belt over a region that extends substantially across the surface width of the belt;
    applying cleaning liquid to the conveyor belt;
    soaking the conveyor belt with the cleaning liquid; and,
    applying rinsing liquid to the conveyor belt;
    wherein said step of applying vacuum is preceded by said steps of applying cleaning liquid, of soaking, and of applying rinsing liquid; and, wherein said steps of applying rinsing liquid and of applying vacuum are delayed after said step of applying cleaning liquid by a soak time that is adequate to facilitate substantial release of debris from the belt and to effect substantial cleaning of the belt.

12. The method of claim 11, wherein said soak time is at least one half hour.

13. The method of claim 11, wherein said soak time is a time during which the moving conveyor belt moves through three to four revolution cycles.

14. The method of claim 11, further including the step of collecting cleaning and rinsing liquids that are draining from beneath the conveyor belt.

15. The method of claim 11, wherein said step of applying rinsing liquid is performed for a time of at least one hour.

16. The method of claim 11, wherein said step of applying cleaning liquid is performed for a time of at least one half hour.

17. A cleaning apparatus for a conveyor belt that is employed to convey foods through an oven for baking of said foods, the cleaning apparatus comprising:

cleaning head means for cleaning said conveyor belt while said belt is moving; and, means for removably mounting said cleaning head means selectively in a first and a second location to the structure of said oven, said first and second location, in relation to the direction of conveyor belt motion, being upstream from the inlet and downstream from the deliver end of the oven, respectively;

wherein said cleaning head means includes means for applying cleaning and rinsing liquids so that cleaning liquid is applied to said conveyor belt while said cleaning head means is mounted in said first location and so that, subsequently, rinsing liquid is applied to said conveyor belt while said cleaning head means is subsequently mounted in said second location; and, wherein said cleaning head means further includes means for vacuuming the moving conveyor belt subsequently to said means for applying cleaning and rinsing liquids applying rinsing liquid while said cleaning head means is mounted in said second location, said means for vacuuming being disposed downstream, in relation to the direction of motion of said conveyor belt, from said means for applying rinsing liquid.

18. The cleaning apparatus according to claim 17, wherein said cleaning head means further includes means for shielding regions located upstream, in relation to the direction of motion of said conveyor belt, of said means for shielding from cleaning and rinsing liquids applied to said conveyor belt and mean for wiping the surface of the moving conveyor belt, said means for shielding and said means for wiping being disposed upstream, in relation to the direction of motion of said conveyor belt, from said means for applying cleaning and rinsing liquids.

19. The cleaning apparatus according to claim 17, wherein said cleaning head means further includes means for brushing said conveyor belt, said means for brushing being disposed downstream, in relation to the direction of motion of said conveyor belt, from said means for applying cleaning and rinsing liquids.

20. A method of cleaning a conveyor belt that is employed to convey foods through an oven for baking of the foods, the method comprising the steps of:

moving said conveyor belt;

cleaning said conveyor belt by cleaning head means while the step of moving is effected; and, removably mounting said cleaning head means selectively in a first and a second location to the structure of said oven, said first and second location, in relation to the direction of conveyor belt motion, being upstream from the inlet and downstream from the delivery end of the oven, respectively, the step of cleaning comprising, in the order given, the steps of;

applying cleaning liquid to said belt at said first location while said cleaning head means is mounted at said first location;

dismounting said cleaning head means from the oven structure at said first location;

mounting said cleaning head means to the oven structure at said second location;

mounting vacuum means on said cleaning head means, said vacuum means serving for vacuuming said belt; and, applying rinsing liquid to and vacuuming said belt at said second location while said cleaning head means is mounted at said second location;

wherein the steps of applying rinsing liquid and of vacuuming are preceded by a step of soaking the conveyor belt with cleaning liquid applied during the step of applying cleaning liquid, the step of soaking having a duration that is adequate to facilitate substantial release of debris from the belt and to effect substantial cleaning of the belt.

21. The method according to claim 20, wherein the steps of applying cleaning liquid and applying rinsing liquid include the step of shielding regions of the oven structure and the belt from applied liquids.

22. The method according to claim 20, wherein the steps of applying cleaning liquid and applying rinsing liquid include the step of wiping the surface of the belt.

23. The method according to claim 20, wherein the steps of applying cleaning liquid and applying rinsing liquid include the step of brushing the belt.

* * * * *